(12) United States Patent
Kasazumi et al.

(10) Patent No.: US 11,125,994 B2
(45) Date of Patent: Sep. 21, 2021

(54) DISPLAY APPARATUS

(71) Applicant: Panasonic Intellectual Property Management Co., Ltd., Osaka (JP)

(72) Inventors: Ken'ichi Kasazumi, Osaka (JP); Kosuke Kubota, Osaka (JP); Masahito Ogata, Osaka (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/328,714

(22) PCT Filed: Sep. 8, 2017

(86) PCT No.: PCT/JP2017/032448
§ 371 (c)(1),
(2) Date: Feb. 26, 2019

(87) PCT Pub. No.: WO2018/051912
PCT Pub. Date: Mar. 22, 2018

(65) Prior Publication Data
US 2019/0196187 A1    Jun. 27, 2019

(30) Foreign Application Priority Data
Sep. 14, 2016 (JP) .............................. JP2016-179942

(51) Int. Cl.
*G02B 27/01* (2006.01)
*G02B 30/52* (2020.01)
(Continued)

(52) U.S. Cl.
CPC .......... *G02B 27/0101* (2013.01); *B60K 35/00* (2013.01); *G02B 26/101* (2013.01);
(Continued)

(58) Field of Classification Search
CPC ............ B60K 35/00; G02B 2027/0127; G02B 2027/0138; G02B 2027/014;
(Continued)

(56) References Cited

U.S. PATENT DOCUMENTS 8,970,451 B2 * 3/2015 Nagasawa .............. G02B 27/01
345/7
9,222,800 B1 * 12/2015 Scherer .................. G08G 5/065
(Continued)

FOREIGN PATENT DOCUMENTS

| EP | 2412557 | 2/2012 |
| JP | 2009-150947 | 7/2009 |
| JP | 2010-221830 | 10/2010 |

OTHER PUBLICATIONS

International Search Report of PCT application No. PCT/JP2017/032448 dated Nov. 14, 2017.

*Primary Examiner* — Kenneth Bukowski
(74) *Attorney, Agent, or Firm* — Greenblum & Bernstein, P.L.C.

(57) ABSTRACT

A display apparatus that displays a virtual image having a shape that follows an object to be superimposed when viewed from a user is provided. An optical system that is included in the display apparatus and displays a virtual image that is three-dimensional includes a laser that emits laser light, a MEMS scanner that performs scanning with the laser light, a screen that forms an image on a surface of the screen with the MEMS scanner scanning the surface with the laser light, a projection unit that generates a virtual image by projecting the image formed onto a display medium, and a drive unit that reciprocates the screen scanned with the laser light in a predetermined section along an optical path of the optical system at a predetermined cycle. The MEMS scanner changes a vertical movement speed of a scan line according to a shape of an object (Continued)

included in a background and is superimposed with the virtual image in scanning performed with the laser light at a scanning cycle in synchronization with a cycle of the reciprocation.

10 Claims, 8 Drawing Sheets (51) Int. Cl.
*B60K 35/00* (2006.01)
*G02B 26/10* (2006.01)
(52) U.S. Cl.
CPC ......... *G02B 27/0179* (2013.01); *G02B 30/52* (2020.01); *G02B 2027/014* (2013.01); *G02B 2027/0127* (2013.01); *G02B 2027/0138* (2013.01); *G02B 2027/0181* (2013.01); *G02B 2027/0185* (2013.01)
(58) Field of Classification Search
CPC .... G02B 2027/0181; G02B 2027/0185; G02B 26/101; G02B 27/0101; G02B 27/0179; G02B 27/2278; G02B 30/52

USPC ........................................................... 345/7
See application file for complete search history.

(56) References Cited

U.S. PATENT DOCUMENTS

| 9,267,808 | B2* | 2/2016 | Nagasawa ............. G09G 5/377 |
| 9,852,547 | B2* | 12/2017 | Bostick ................ G02B 27/017 |
| 10,215,583 | B2* | 2/2019 | Ng-Thow-Hing ..... G02B 27/01 |
| 10,339,711 | B2* | 7/2019 | Ng-Thow-Hing ..... G02B 27/01 |
| 10,488,655 | B2* | 11/2019 | Kasazumi ............. G09G 3/025 |
| 2003/0193505 | A1* | 10/2003 | Ribadeau Dumas ....... G06F 3/04815 345/473 |
| 2009/0005961 | A1* | 1/2009 | Grabowski .......... G01C 21/365 701/532 |
| 2009/0160736 | A1 | 6/2009 | Shikita |
| 2012/0170130 | A1* | 7/2012 | Sasaki .................... B60K 35/00 359/630 |
| 2013/0181982 | A1* | 7/2013 | Tasaki ................... B60K 35/00 345/419 |
| 2016/0313562 | A1* | 10/2016 | Saisho ............... G02B 27/0179 |
| 2019/0018250 | A1* | 1/2019 | Kasazumi .......... G02B 27/0179 |

* cited by examiner

(a) Distance between scanner and screen (b) Vertical position of scan line (c) Speed during scanning

FIG. 7B (a) Distance between scanner and screen (b) Vertical position of scan line (c) Speed during scanning

DISPLAY APPARATUS

This application is a U.S. national stage application of the PCT International Application No. PCT/JP2017/032448 filed on Sep. 8, 2017 which claims the benefit of foreign priority of Japanese patent application No. 2016-179942 filed on Sep. 14, 2016, the contents all of which are incorporated herein by reference.

TECHNICAL FIELD

The present invention relates to a display apparatus.

BACKGROUND ART

A head-up display (also abbreviated below as an HUD) is known as a display apparatus. The HUD projects an image onto a translucent display medium and presents this image to a user while superimposing this image on an object that can be viewed through the display medium. This can achieve so-called augmented reality (AR).

Some vehicular HUDs present driving assisting information or other information to a driver as a virtual image that is located ahead of a windshield and is viewed while being superimposed on an actual scene.

An HUD described in PTL 1 moves a screen that is scanned with light for forming an image along an optical-axis direction to change a display position of a virtual image (the display position being a position of a virtual image perceived by a driver, hereinafter, a distance to this position is referred to as a "display distance"). An HUD described in PTL 2 uses perspective to give depth perception to a virtual image to be presented to a driver.

CITATION LIST

Patent Literature

PTL 1: Unexamined Japanese Patent Publication No. 2009-150947
PTL 2: Unexamined Japanese Patent Publication No. 2010-221830

SUMMARY OF THE INVENTION

However, with the HUD described in PTL 1 or PTL 2, it is difficult to display a virtual image having a sense of continuous depth and further a virtual image representing a difference in height, for example, a virtual image of a graphic having a shape that follows undulations of a road surface.

The present invention provides a display apparatus for presenting a virtual image having a shape that follows an object to be superimposed when viewed from a user including a driver.

A display apparatus according to an aspect of the present invention is a display apparatus including an optical system for displaying a virtual image that is three-dimensional by using a display medium that is transparent. The optical system includes a laser, a micro electro mechanical system (MEMS) scanner, a screen, a projection unit, and a drive unit. The laser emits laser light. The MEMS scanner receives and reflects the laser light, and performs scanning with the laser light that is reflected. The MEMS scanner scans the screen with the laser light to form an image on a surface of the screen. The projection unit projects the image formed on the surface of the screen onto the display medium to generate a virtual image to be perceived by a user. The drive unit reciprocates the screen scanned with the laser light in a predetermined section along an optical path of the optical system at a predetermined cycle. The MEMS scanner performs the scanning with the laser light by repeatedly raster-scanning the screen with the laser light at a scanning cycle that is synchronized with the above predetermined cycle. In the raster scan, a vertical movement speed of a scan line is changed according to a shape of an object that is included in a background and is superimposed with the virtual image when viewed from the user.

It should be noted that those comprehensive, specific aspects may be implemented by a system, a method, an integrated circuit, a computer program, or a computer-readable recording medium such as a compact disc read-only memory (CD-ROM), or may be implemented by any combination of the system, the method, the integrated circuit, the computer program, and the recording medium.

The display apparatus according to the present invention can display a virtual image having a shape that follows an object to be superimposed when viewed from a user.

DESCRIPTION OF EMBODIMENT (Knowledge Underlying the Present Invention)

The inventors of the present application have found that the following problems arise in the display apparatuses described in the section of "BACKGROUND ART".

To present virtual images whose display distances vary temporally or spatially to a user, the display apparatus disclosed in PTL 1 uses a plurality of screens that are disposed so as not to overlap each other when viewed from a scanning unit and whose distances to a projection unit can be changed separately. Images formed on the screens are respectively projected onto three sub-regions so as not to overlap each other. Three sub-regions are defined by dividing a predetermined region of a windshield into three portions.

However, in such a display apparatus, a virtual image generated while being projected onto an identical sub-region during an identical time period has the same display distance. Accordingly, steps of the display distance depend on a number of sub-regions, that is, a number of screens.

Disposition of the virtual images having display distances different from each other depends on a dividing mode of the predetermined region. For example, when the predetermined region is divided into vertically-long sub-regions that are horizontally aligned, virtual images having the display distances different from each other can be displayed while being horizontally aligned, but cannot be displayed while being vertically aligned. Similarly, when the predetermined region is divided into horizontally-long sub-regions that are vertically aligned, virtual images having the display distances different from each other can be displayed while being vertically aligned, but cannot be displayed while being horizontally aligned.

Although such a display apparatus can present an object located in a certain distance from a driver, such as a traffic sign or an intersection, it is difficult to display a virtual image having a display distance that varies continuously from a foreground to a background, for example. Accordingly, to display a virtual image of an arrow for guiding a route extending from a current driving position to a turning position, or a graphic that is viewed so as to be superimposed on lane marking for lane departure prevention, a method that further uses geometrical perspective as described in PTL 2 is conceivable. However, this case has a problem in which an image for displaying the virtual image is limited in size to an identical screen, or steps of the display distance need to be decreased while equalizing distances from adjacent screens to the projection unit, to form a larger image.

Furthermore, unlike a case of a virtual image located at a constant display distance, in a case where a virtual image having a sense of continuous depth is viewed by a user while superimposing the virtual image on an object such as a road, when a shape following a surface shape of the object to some extent cannot be represented, the user has an uncomfortable feeling. With the above-described virtual image to be superimposed on lane marking for lane departure prevention, which is presented to the driver, the uncomfortable feeling may cause the driver to misrecognize a surrounding state, thereby causing a safety hazard.

To solve those problems, a display apparatus according to an aspect of the present invention is a display apparatus including an optical system for displaying a virtual image that is three-dimensional by using a display medium that is transparent. The optical system includes a laser, a micro electro mechanical system (MEMS) scanner, a screen, a projection unit, and a drive unit. The laser emits laser light. The MEMS scanner receives and reflects the laser light, and performs scanning with the laser light that is reflected. The MEMS scanner scans the screen with the laser light to form an image on a surface of the screen. The projection unit projects the image formed on the surface of the screen onto the above-described display medium to generate a virtual image to be perceived by a user. The drive unit reciprocates the above-described screen scanned with the laser light in a predetermined section along an optical path of the optical system at a predetermined cycle. The MEMS scanner performs the scanning with the laser light by repeatedly raster-scanning the screen with the laser light at a scanning cycle synchronized with the above-described predetermined cycle. In the raster scan, a vertical movement speed of a scan line is changed according to a shape of an object that is included in a background and is superimposed with the virtual image when viewed from a user.

The user thus views, through the display medium, a virtual image generated by projecting, onto the display medium, a three-dimensional image generated by a residual image effect of the image formed on a surface of the screen. This virtual image is perceived by the user as a virtual image having a sense of depth according to a reciprocation stroke of the screen of a graphic that can be depicted over a two-dimensional range according to a movement range of the raster scan of the screen in horizontal and vertical directions. A vertical movement speed of the scan line is changed to change a vertical position of the scan line with respect to a position on a route of reciprocation movement of the screen. This configuration can represent a difference in height along a depth direction with this virtual image.

More specifically, for example, an object included in a background of the above-described virtual image is a road extending forward on a route of the user, and the MEMS scanner may change the vertical movement speed based on geographic information indicating a shape of the road, to cause a shape of the virtual image to vertically follow the shape of the road.

With this configuration, by changing the vertical movement speed of the scan line according to an inclination of the road included in the background of the virtual image, the user can view a virtual image of the graphic following the shape of the road whose inclination is changed such that a height of the virtual image is changed along the depth direction.

For example, the above display medium may be a windshield of a vehicle. The above optical system may be mounted on the vehicle. The above geographic information may include at least one of detected geographic information obtained by using a sensor that is mounted on the vehicle and detects a landform ahead of the vehicle, and map information indicating the landform ahead of the vehicle. The virtual image may include graphics or characters indicating at least one of route guidance information and information about the road, to be presented to the user.

This configuration can change the vertical movement speed of the scan line such that the graphic or other symbols in the virtual image follows the shape of the road when viewed from the user, based on map information that can be obtained from, for example, a navigation system or information that is obtained from a sensor that can detect the landform ahead of the vehicle and indicates the shape of the road included in the background of the virtual image.

It should be noted that those comprehensive, specific aspects may be implemented by a system, a method, an integrated circuit, a computer program, or a non-transitory recording medium that is computer-readable, such as a CD-ROM, or may be implemented by any combination of the system, the method, the integrated circuit, the computer program, and the non-transitory recording medium.

Hereinafter, a specific description of an exemplary embodiment will be given with reference to the drawings. It should be noted that the exemplary embodiment that will be described below provides comprehensive or specific examples of the present invention. Numerical values, shapes, materials, constituent elements, and disposition and connection modes of the constituent elements, for example, illustrated in the following exemplary embodiment are merely examples, and therefore are not intended to limit the present invention.

Further, among the constituent elements in the following exemplary embodiment, the constituent elements not recited in the independent claim indicating the broadest concept are described as optional constituent elements.

(Exemplary Embodiment)

Figure 1:
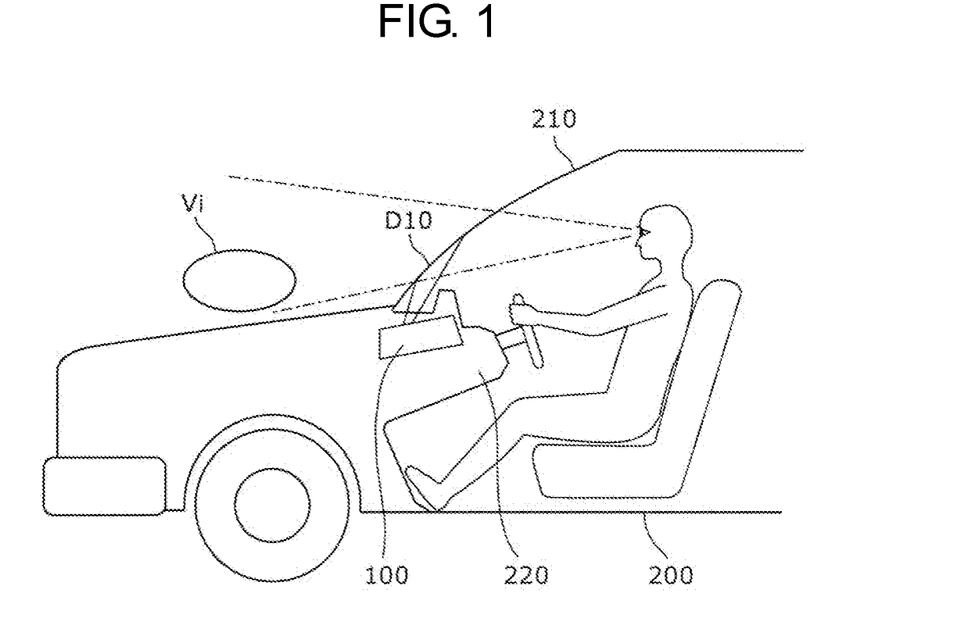
FIG. 1 is a view of a usage example of a display apparatus according to an exemplary embodiment.

FIG. 1 is a view of a usage example of a display apparatus according to the present exemplary embodiment.

Display apparatus 100 in the present exemplary embodiment is configured as a head-up display (HUD) to be mounted on a vehicle, and is mounted around an upper surface of dashboard 220 of vehicle 200.

Display apparatus 100 emits light to region D10 in a viewing field of a driver indicated by alternate long and short dash lines on windshield 210. A part of emitted light passes through windshield 210, but the remaining part of the emitted light is reflected by windshield 210. This reflected light is directed to eyes of a driver sitting on a driver seat, who is a user of display apparatus 100. The driver perceives the reflected light entered into the eyes of the driver as virtual image Vi that appears to be an image of an object present on the opposite side of windshield 210 (outside vehicle 200), with an actual object that can be viewed through windshield 210 as a background. This situation is expressed below such that display apparatus 100 generates virtual image Vi, or display apparatus 100 displays virtual image Vi to the user.

Figure 2:
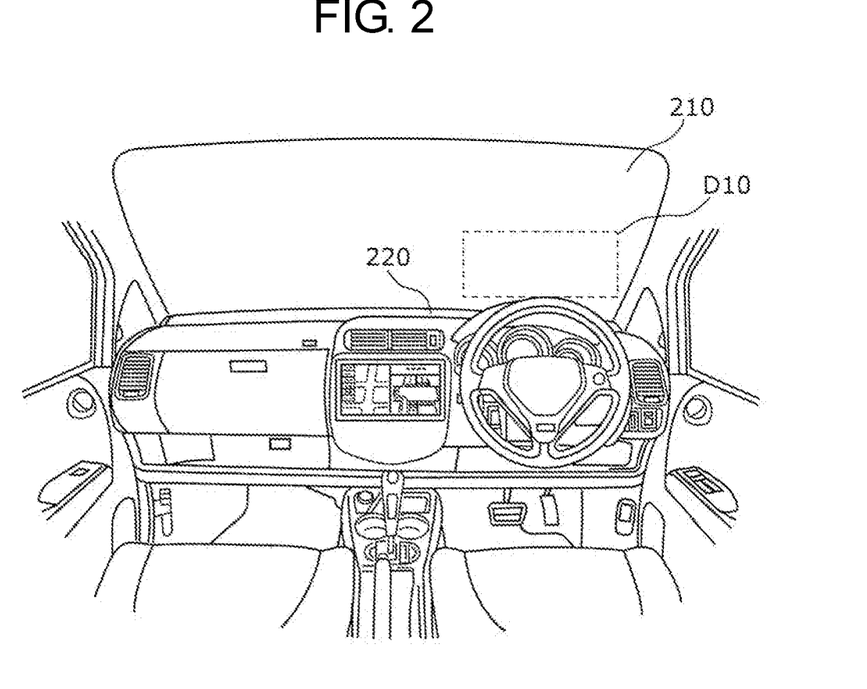
FIG. 2 is a view of an example of a region onto which the display apparatus according to the exemplary embodiment projects an image.

FIG. 2 is a view of an example of region D10 that is a region onto which the light is emitted by display apparatus 100 in the present exemplary embodiment.

Region D10 is positioned closer to a lower part of windshield 210 on a driver seat side, as indicated as a region surrounded by a dashed line in FIG. 2, for example. Display apparatus 100 mounted on dashboard 220 emits light to region D10 as illustrated in FIG. 1, thereby projecting an image onto windshield 210. With this configuration, virtual image Vi that appears to be an image of an object present outside vehicle 200 for the driver is generated.

Note that, with respect to the image projected onto windshield 210, vertically different positions in this region D10 can be perceived so as to be located at different distances from the driver in virtual image Vi. For example, in an example illustrated in FIGS. 1 and 2, region D10 is located lower than a height of driver's eyes. Therefore an image located at a lower position in region D10 can be perceived to be located at a nearer position from the driver in virtual image Vi. Further an object located at a higher position in the image projected onto region D10 can be perceived as an object located at a farther position from the driver in virtual image Vi. A principal of such perception is described by a kind of geometrical perspective (vertical perspective).

Figure 3:
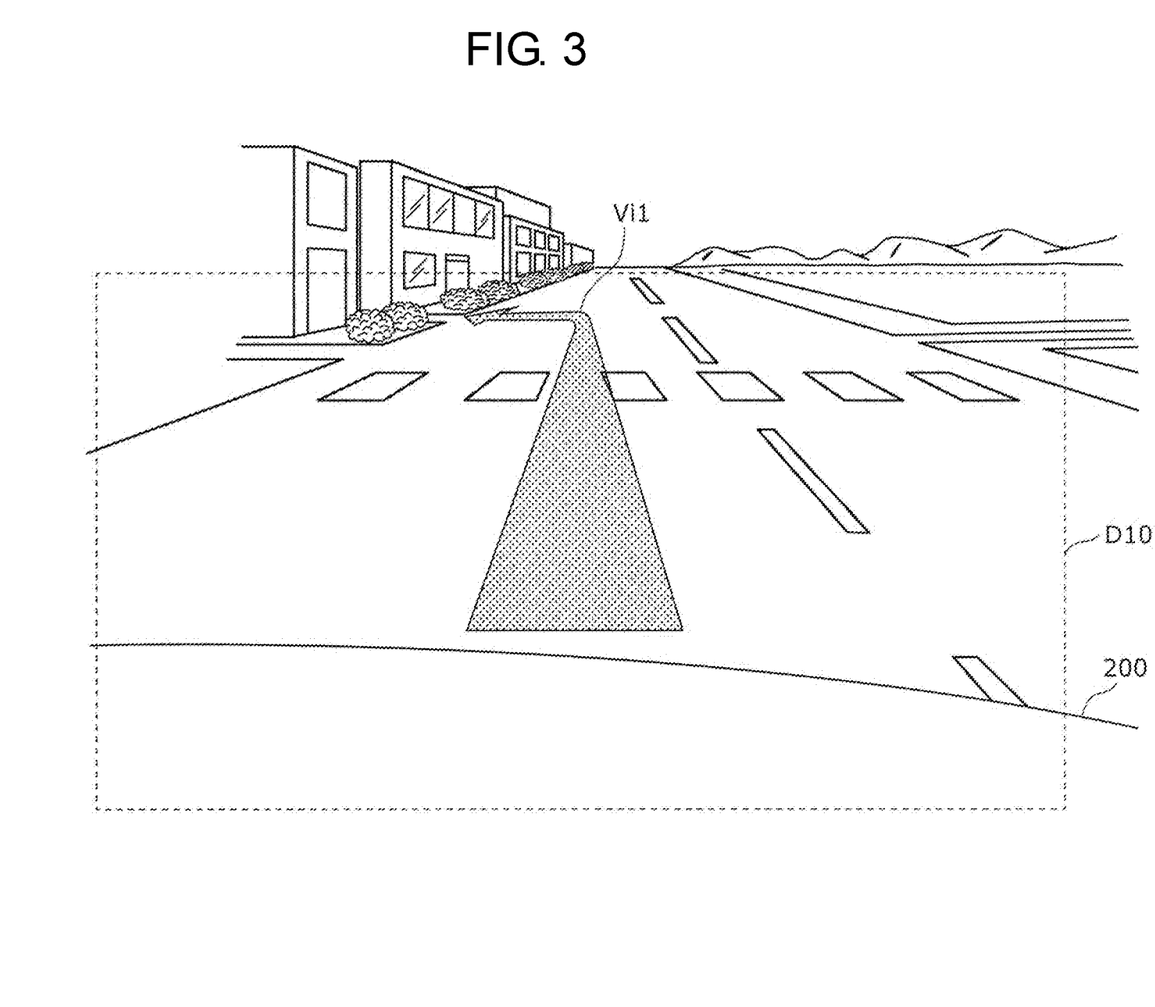
FIG. 3 is a view of an example of superimposing a virtual image generated by the display apparatus according to the exemplary embodiment on a scene ahead of a vehicle.

FIG. 3 is a view of an example of a virtual image generated by display apparatus 100 according to the present exemplary embodiment and an example of superimposing this virtual image on a scene ahead of vehicle 200 viewed from the driver of driving vehicle 200.

FIG. 3 schematically illustrates, as a whole, a part of a scene within a viewing field of the driver (not illustrated) who drives vehicle 200. Note that the frame with the dashed line indicating region D10 onto which the image is projected from display apparatus 100 is illustrated for convenience of explanation of the present exemplary embodiment, and is not provided actually. Therefore the frame is not perceived by the driver. Reference sign 200 indicates an engine hood that is a part of vehicle 200. An image indicating an arrow, which is attached with reference sign Vi1, is an example of virtual image Vi that is generated by display apparatus 100 and is perceived by the driver.

As illustrated in FIG. 3, virtual image Vi1 is displayed so as to be superimposed on a scene that is actually viewed within the driver's viewing field. The image indicating the arrow, which is virtual image Vi1, points to a left-turn point located ahead of vehicle 200 with a tip of the arrow, to the driver.

Such display is achieved as follows, for example. Vehicle 200 includes an unillustrated car navigation system. This car navigation system obtains a route to a destination and determines guidance information to be displayed. Vehicle 200 includes a camera that captures an image of the unillustrated driver. The image captured by this camera is analyzed to obtain information indicating a position of driver's eyes (hereinafter, also referred to as viewing point information). Based on the guidance information thus determined and the viewing point information thus obtained, display apparatus 100 calculates a position of a point within region D10, which appears so as to overlap the left-turn point ahead of vehicle 200, when viewed from the driver. Then, display apparatus 100 projects an image onto region D10 such that the tip of the arrow corresponds to the calculated position.

Note that virtual image Vi1 that is the image of the arrow has an external appearance based on the perspective (perspective projection) to facilitate the driver who views virtual image Vi1 to get depth perception. For example, with respect to a shaft of the arrow, a portion perceived by the driver to be closer to the driver, that is, a portion closer to the bottom in region D10 has a thicker width, and a portion perceived by the driver to be farther from the driver, that is, a portion closer to the top in region D10 has a thinner width. Moreover, contour lines of the shaft on right and left sides extend toward a predetermined vanishing point.

Virtual image Vi1 generated in display apparatus 100 according to the present exemplary embodiment is displayed such that the driver can perceive a continuous display distance, although this feature is not represented in FIG. 3. In other words, virtual image Vi1 is not viewed by the driver to be an image of an arrow depicted using perspective on a plane substantially perpendicular to the ground at a predetermined position ahead of windshield 210 viewed from the driver, as a conventional example. Virtual image Vi1 is viewed by the driver to be a virtual image (hereinafter, also referred to as a virtual image having a sense of depth) extending from a starting point at a predetermined position ahead of windshield 210 along a direction away from the driver. A configuration and an operation for generating virtual image Vi1 thus perceived by the driver will be described with reference to FIG. 4.

Figure 4:
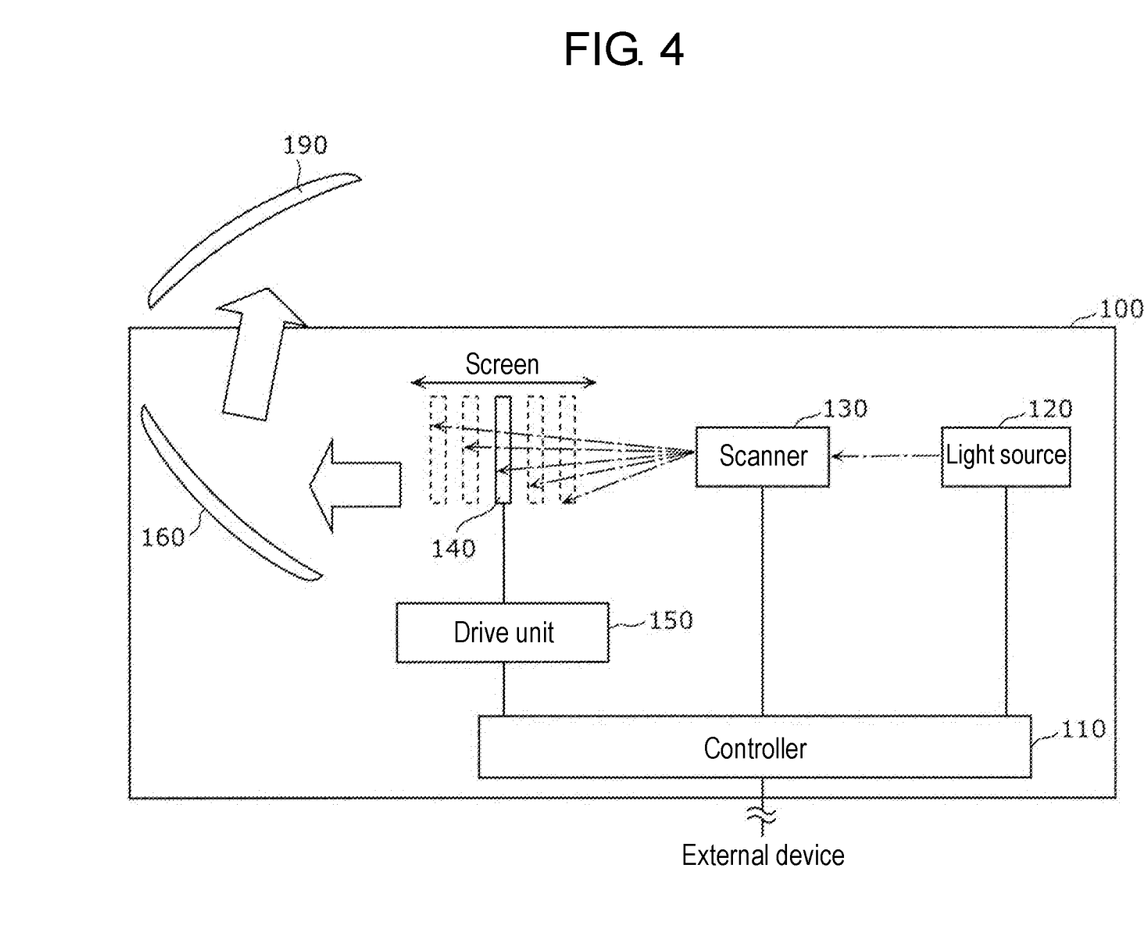
FIG. 4 is a block diagram illustrating a functional configuration of the display apparatus according to the exemplary embodiment.

FIG. 4 is a block diagram illustrating a functional configuration of display apparatus 100 according to the present exemplary embodiment.

Display apparatus 100 includes light source 120, scanner 130, screen 140, drive unit 150, controller 110, and projection unit 160.

Light source 120 emits light indicating a virtual image to be displayed by display apparatus 100. For example, light source 120 is implemented by a pico-projector that includes semiconductor lasers that emit red (R), green (G), and blue (B) light as a light emitting body. Such a pico-projector enables display of a virtual image with high visibility regardless of colors of objects or vehicle bodies contained in a background of the virtual image, or ambient brightness. Use of the laser light enables focusing on an irradiated surface, independently of a distance to the irradiated surface and an angle between the laser light and the irradiated surface. Furthermore, use of the pico-projector minimizes an installation space, for example, a space in dashboard 220 that is occupied by display apparatus 100 in vehicle 200 due to its compact body. It should be noted that in FIG. 4, arrows of alternate long and short dash lines that start from light source 120 indicate optical paths of light emitted from light source 120.

Scanner 130 is disposed on the optical path of the light emitted from light source 120 and scans screen 140 described later with this emitted light.

Scanner 130 is implemented with a MEMS scanner, for example. Screen 140 is implemented by a flat diffusing screen, for example. Scanner 130 raster-scans screen 140 with the light emitted from light source 120, thereby forming, on screen 140, an image to be displayed as a virtual image.

Screen 140 is disposed so as to intersect the optical path of the above emitted light reflected by scanner 130, and is driven by drive unit 150 described later. More specifically, screen 140 vibrates by repeating reciprocating parallel movement (hereinafter, also referred to as reciprocation) along this optical path as indicated by a double-headed arrow with a solid line, within a predetermined section between scanner 130 and projection unit 160.

Drive unit 150 is implemented with, for example, an actuator, and causes screen 140 to perform the above-described reciprocation, in accordance with a signal from controller 110 that will be described below.

Controller 110 is implemented with, for example, a central processing unit (CPU) or a processor, and executes a computer program read from a recording medium (not illustrated) such as a memory, to control light source 120, scanner 130, and drive unit 150.

More specifically, controller 110 obtains information from external devices for display apparatus 100. Specific examples of such external devices according to the present exemplary embodiment include a car navigation system, a sensor for detecting an obstacle ahead of vehicle 200, and a camera for obtaining viewing point information. Based on such information, controller 110 calculates a position of an object to be displayed as a virtual image that is a graphic of the arrow in the above-described example, and a position on which an image is projected for displaying this virtual image on display medium 190. Controller 110 then outputs control signals for control based on this calculation to light source 120, scanner 130, and drive unit 150, and controls those devices.

The image formed on a surface of screen 140 by scanner 130 that scans with the laser light is projected onto display medium 190 by projection unit 160. Two block arrows on a left side of FIG. 4 indicate an optical path of projection of an image formed on a surface of screen 140, which is performed by projection unit 160. Projection unit 160 is implemented with, for example, an optical element such as a mirror or a lens, or a combination of a plurality of optical elements.

In the following description, a combination of light source 120 (or at least the laser included in light source 120), scanner 130, screen 140, and projection unit 160 that have been described above is defined as the optical system included in display apparatus 100 according to the present exemplary embodiment.

In the present exemplary embodiment, display medium 190 corresponds to windshield 210 in vehicle 200. Projection unit 160 projects the image formed on the surface of screen 140 toward transparent display medium 190 such as windshield 210. With this configuration, the virtual image that is perceived by a user, so as to be displayed on the opposite side of display medium 190 is generated. The user corresponds to the driver seated on a driver seat of vehicle 200 in the present exemplary embodiment. Note that transparent display medium 190 is not limited to be colorless. For example, display medium 190 may be colored, or may have low transmittance for ultraviolet light or infrared light. When display medium 190 is the windshield of the vehicle as in the present exemplary embodiment, there is a degree of freedom in transmittance for visible light within a range that satisfies associated regulations.

Next, display of a virtual image having a sense of depth, which is performed by display apparatus 100 thus configured, will be described.

A distance from screen 140 to display medium 190 is changed along the optical path within a range of a stroke of the reciprocation described above. With a shorter distance along the optical path between screen 140 and display medium 190, a display distance of the virtual image becomes shorter. In other words, the user views the virtual image at a shorter distance. In contrast, with a longer distance along the optical path between screen 140 and display medium 190, the display distance of the virtual image becomes longer. In other words, the user views the virtual image at a longer distance. This may also apply to conventional techniques.

Herein, for example, when an image is formed on a surface of screen 140 by scanning screen 140 with laser light while moving screen 140 in parallel along the optical path, a virtual image can be displayed so as to vary in display distance due to this movement.

In display apparatus 100 according to the present exemplary embodiment, such movement is repeated at a predetermined cycle. In other words, scanner 130 raster-scans screen 140 with the laser light while drive unit 150 reciprocates (vibrates) screen 140 at the predetermined cycle.

This predetermined cycle needs to be a cycle reciprocating at least 10 times to 20 times per second (a frequency of 10 Hz to 20 Hz) to a degree in which a residual image effect of the image formed on the surface of screen 140 is at least exerted, if the raster scan is performed in only a forward path or a return path of the reciprocation of screen 140. However, in order to prevent the virtual image from being apparently blinked when viewed by user's eyes or in order to prevent the virtual image from being viewed to be sparse, that is, in order to cause the virtual image to be viewed to be spatially and temporally smooth, screen 140 is reciprocated at a higher frequency, which is about 50 Hz to 100 Hz. The raster scan is performed such that a cycle of the raster scan (hereinafter, also referred to as a scanning cycle) is synchronized with the cycle of the reciprocation of screen 140.

Herein, it is assumed that, for example, screen 140 reciprocates at 60 Hz, and the raster scan that is performed in only the forward path or the return path of screen 140 is performed at 60 Hz in synchronization with the cycle of the reciprocation. At this time, images corresponding to 60 frames per second are formed on screen 140. The user perceives the images corresponding to 60 frames to be spatially and temporally continuous. To describe in another way, a set of residual images including bright spots, on screen 140, produced at a portion where the laser light that is two-dimensionally scanned by scanner 130 along a horizontal direction (defined as an X-axis direction) and a vertical direction (defined as a Y-axis direction) intersects screen 140 reciprocating along a direction of the optical path (defined as a Z-axis direction) intersecting an XY plane is an image formed on screen 140 that is a three-dimensional image in an XYZ space. Projection unit 160 projects this image onto display medium 190. Among spots on the image, spots having different distances to display medium 190 have display distances different from each other. Therefore an entire image projected onto display medium 190 is perceived as a virtual image providing a sense of depth by the user.

As described above, in the operation of display apparatus 100 for displaying a virtual image like virtual image Vi1 illustrated in FIG. 3, the cycle of reciprocation of screen 140 is synchronized with the scanning cycle of raster scan performed by scanner 130.

In this operation, virtual image Vi1 is a virtual image that appears to flatly extend substantially parallel to a flat road surface, and such display of the virtual image is achieved by projecting an image formed with a scan line being vertically moved at a constant speed on screen 140, during the raster scan performed by scanner 130. To achieve this display, shapes and mutual relative positions of screen 140, projection unit 160, and display medium 190, and a position, a shape, or other factors of the image formed on screen 140 are appropriately adjusted as design matters.

Note that, by changing a speed of vertical movement in the above raster scan while maintaining the synchronization, a virtual image having a difference in height can be displayed, which is different from virtual image Vi1 illustrated in FIG. 3. Hereinafter, an operation for displaying such a virtual image will be described using an example.

Figure 5:
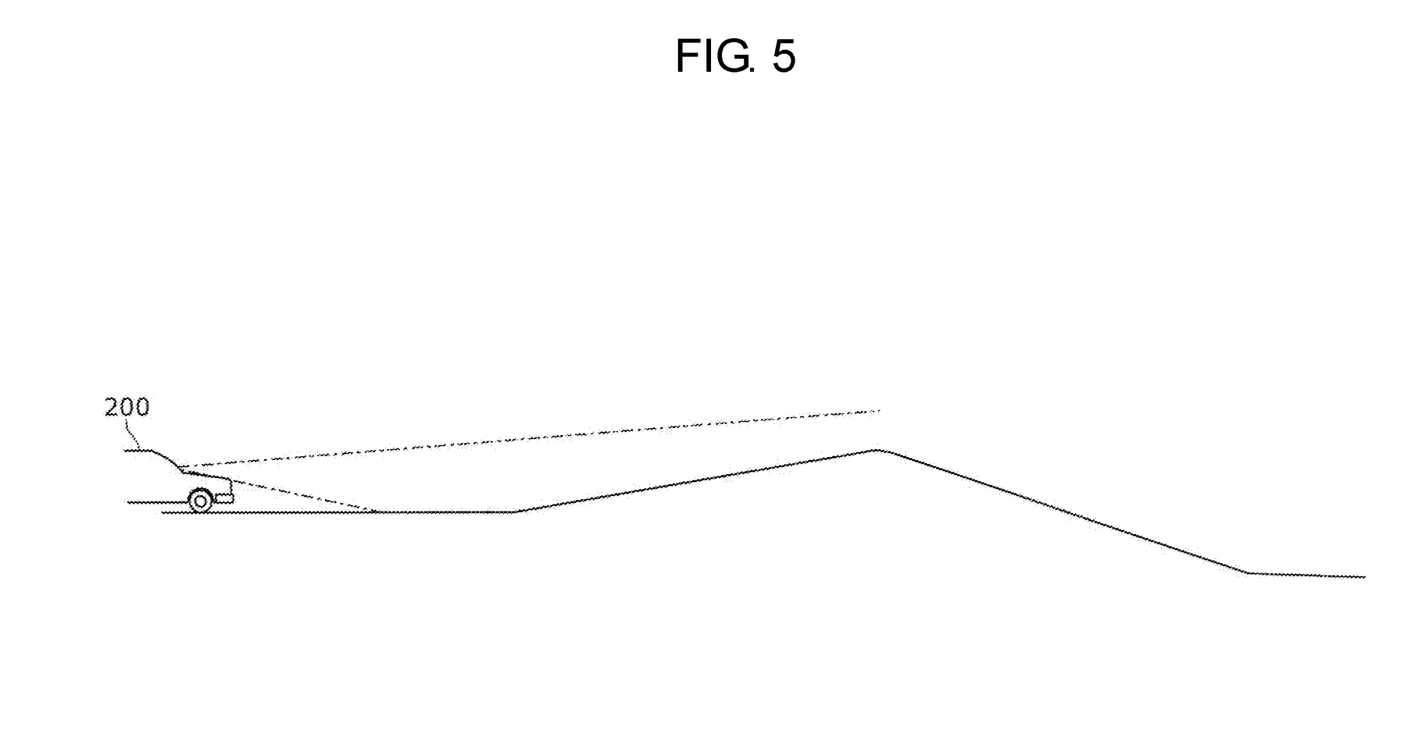
FIG. 5 is a view for describing a scene where another display mode of the virtual image is achieved by the display apparatus according to the exemplary embodiment.

In the description, a scene illustrated in FIG. 5 is used as an example. The scene includes an upward slope ahead of vehicle 200 driving a flat area, and a downward slope ahead of the upward slope. In FIG. 5, a range between alternate long and short dash lines indicates a viewing field of the driver of vehicle 200, similar to FIG. 1.

Figure 6A:
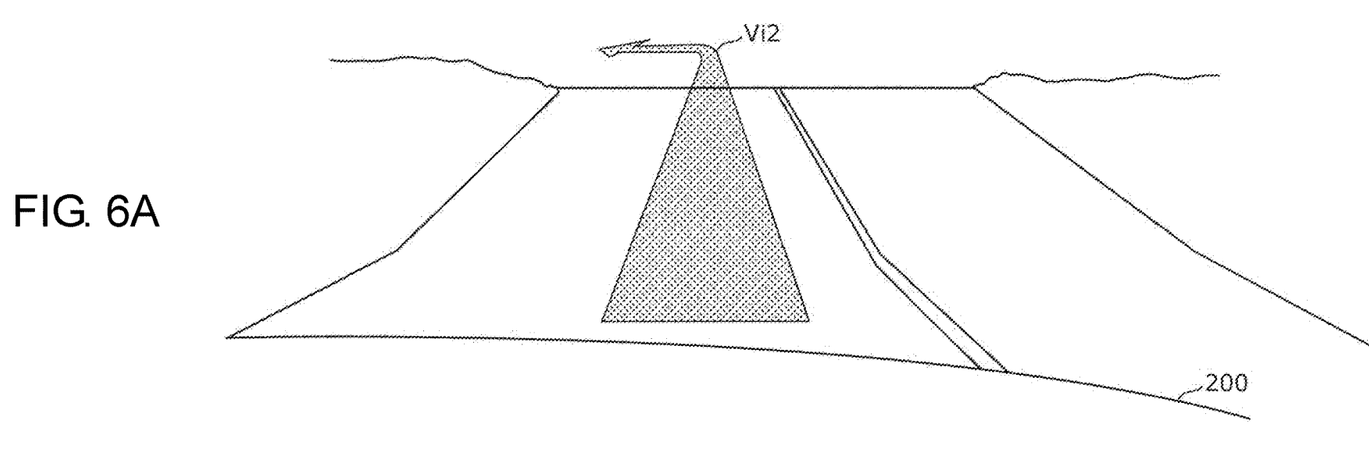
FIG. 6A is a view of an example of an appearance of a virtual image having a shape not following a background object to be superimposed.

For this scene, in the raster scan performed by scanner 130 as described above, when an image of an arrow formed with the vertical movement of the scan line on screen 140 at a constant speed is projected, virtual image Vi2 of the arrow as illustrated in FIG. 6A is displayed to the driver. This arrow appears to be substantially parallel to a road surface of the area on which vehicle 200 is currently driving, but does not appear to be parallel to an anterior road surface that slopes. Therefore a tip of an arrow head of the arrow that is normally to point to a left-turn point located ahead of vehicle 200 points to the sky, thereby making it difficult to grasp a sense of distance. In comparison with virtual image Vi1 illustrated in FIG. 3, virtual image Vi2 is obviously inferior in followability to a background when viewed from the driver. Such a virtual image serving as route guidance information causes the driver to have an uncomfortable feeling, and the uncomfortable feeling may cause the driver to misrecognize a surrounding state after all.

Details of synchronization between a cycle of an operation of scanner 130 and a cycle of an operation of screen 140 in this case will be described with reference to an example illustrated in FIG. 7A.

Figure 7A:
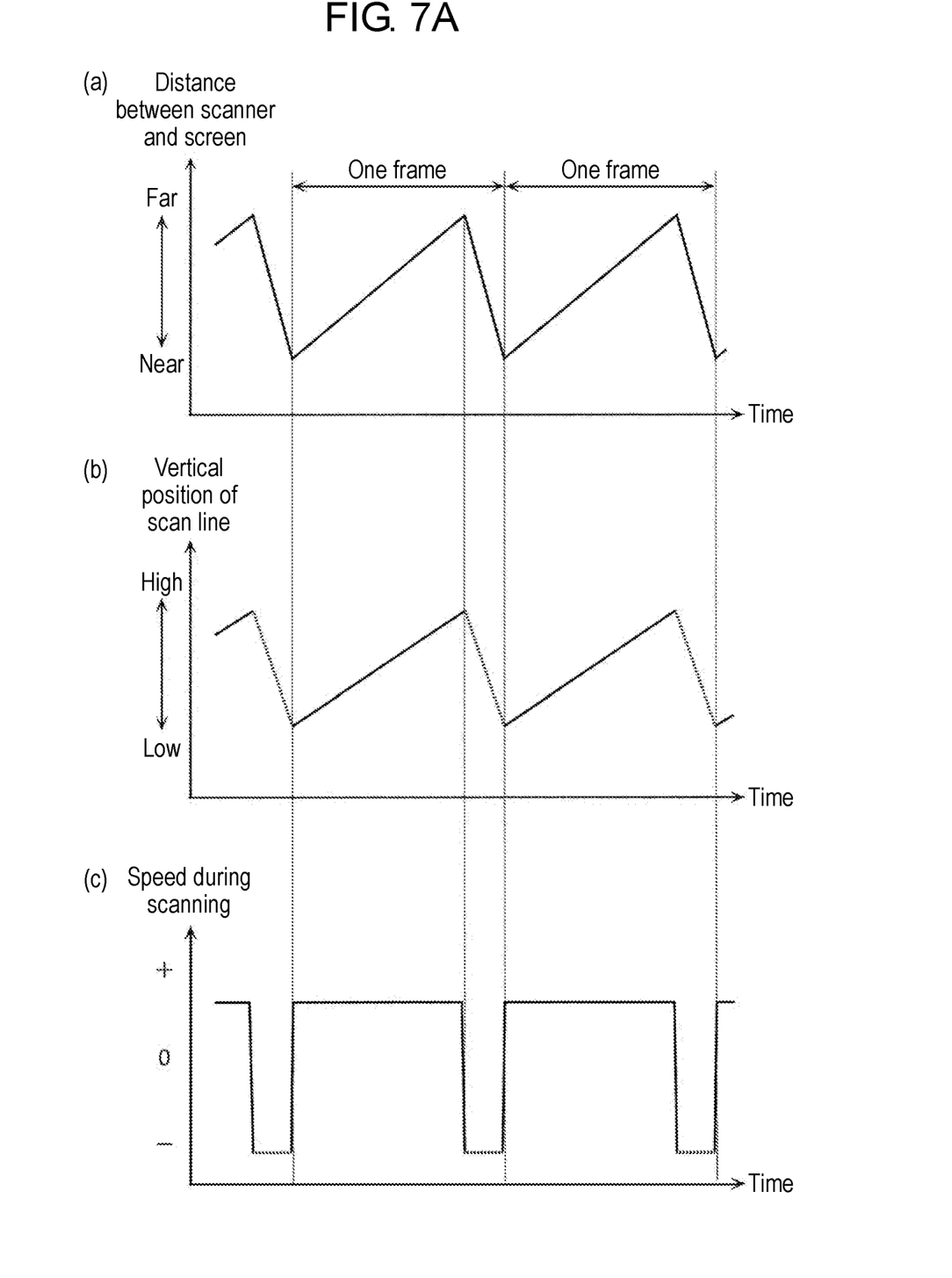
FIG. 7A is a diagram of an example of an action of a scanner and an action of a screen, which are performed at a synchronized cycle.

Part (a) of FIG. 7A indicates an operation of reciprocation of screen 140 with a temporal change of a distance between scanner 130 and screen 140. As illustrated with a saw-tooth broken line, screen 140 repeats an operation for moving in parallel from an initial position over a predetermined stroke so as to be remote from scanner 130, and quickly returning to the initial position on the same route during one cycle. A length of the cycle corresponds to a length of one frame described above. In other words, when images including 60 frames per second are formed on screen 140, the length of the cycle is one sixtieth seconds, and the reciprocation is repeated 60 times per second (vibration at 60 Hz).

Part (b) of FIG. 7A indicates an operation of scanner 130 at a scanning cycle synchronized with the cycle of reciprocation of screen 140, with a temporal change of a vertical position of the scan line. Note that this illustrated broken line macroscopically indicates the change. In other words, while the laser light is scanned horizontally, the position of the scan line does not change. Therefore, more strictly, the change of the position is indicated as a minute stepped broken line. Note that, herein, the graph is illustrated as in part (b) of FIG. 7A to indicate the speed of vertical movement of the scan line. In part (b) of FIG. 7A, the speed of vertical movement of the scan line is represented with an inclination of the line.

As illustrated with a saw-tooth broken line, scanner 130 repeats the scanning cycle in synchronization with the cycle of reciprocation of screen 140. During one cycle of the scanning cycle, the scan line is gradually moved from the initial position that is lowermost to higher position at a constant speed. The scan line is moved so as to be uppermost at a time point when screen 140 reaches a turning back position, and is returned to the initial position concurrently with the movement of screen 140 returning to an initial position. Note that, each of sections with a solid line in the broken line in part (b) of FIG. 7A indicates a period in which scanner 130 emits the laser light to screen 140 as appropriate to form the image to be projected onto display medium 190 by projection unit 160. On the other hand, each of sections of a dashed line indicates a period for returning the scan line to the initial position. During this period, the laser light for forming the image is not emitted to screen 140, and in a sense, this period corresponds to a period for transmitting a vertical blanking interval in a video signal in television broadcasting, for example.

As understood from an inclination of the line in part (b) of FIG. 7A, during the raster scan performed by scanner 130, the speed of vertical movement of the scan line is constant. Part (c) of FIG. 7A is a graph illustrating this speed relative to time. Sections with the solid line and sections with the dashed line in the broken line in part (c) of FIG. 7A are identical in period to the sections with the solid line and the sections with the dashed line in part (b) of FIG. 7A, respectively. The section indicated with the solid line and the section indicated with the dashed line are opposite in movement direction to each other, so that those two sections are different in sign from each other.

Note that such operations of scanner 130 and screen 140 as illustrated in FIG. 7A are normally performed, when the virtual image that appears to follow the flat road as illustrated in FIG. 3 is displayed.

Figure 6B:
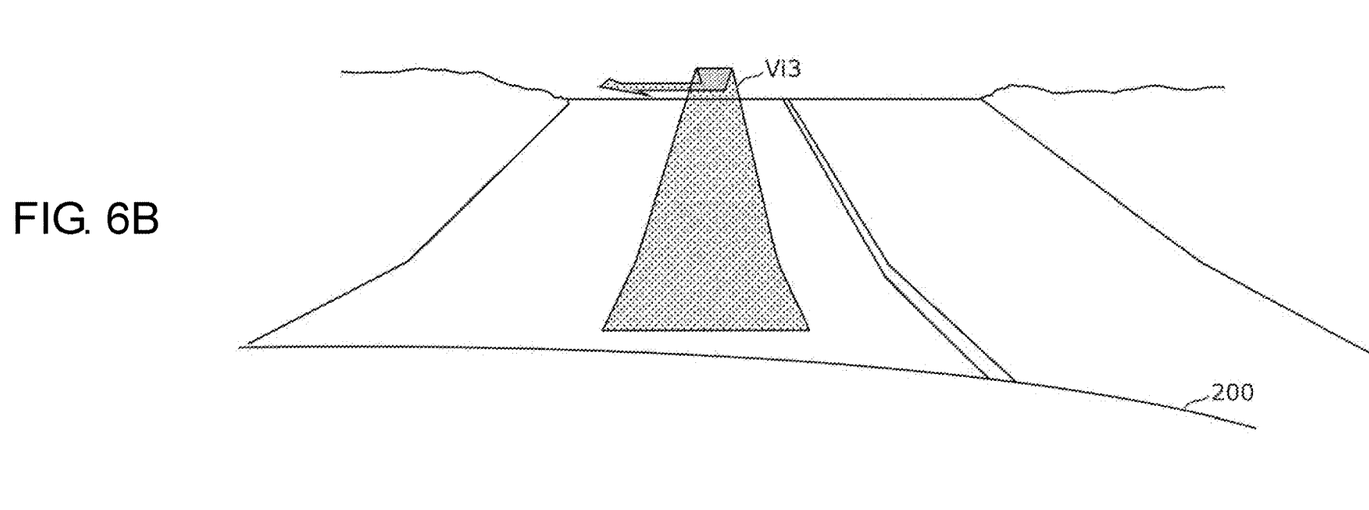
FIG. 6B is a view of an example of an appearance of a virtual image having a shape following the background object to be superimposed.

Herein, display apparatus 100 according to the present exemplary embodiment can further display a virtual image having a shape that follows the background like the road having the shape illustrated in FIG. 5. FIG. 6B is a view of an example of an appearance of a virtual image having a shape that follows a shape of an object in the background. An arrow as a virtual image illustrated in FIG. 6B appears to be substantially parallel to a road surface of a location where vehicle 200 is currently driving, and also appears to be substantially parallel to a road surface of an anterior upward slope while sloping along the road. In an area ahead of a ridge that can be seen ahead of the upward slope, the arrow appears to be lower as the area is farther from the driver. The tip of the arrow head of the arrow that is normally to point to the left-turn point ahead of the vehicle is not viewed to be superimposed on a turning point. However the arrow explicitly indicates at least that the left-turn point is situated over the ridge. Such an arrow relatively eliminates the problem concerned with the arrow as the virtual image in FIG. 6A.

Details of synchronization between a cycle of an operation of scanner 130 and a cycle of an operation of screen 140 in this case will be described with reference to an example illustrated in FIG. 7B.

Figure 7B:
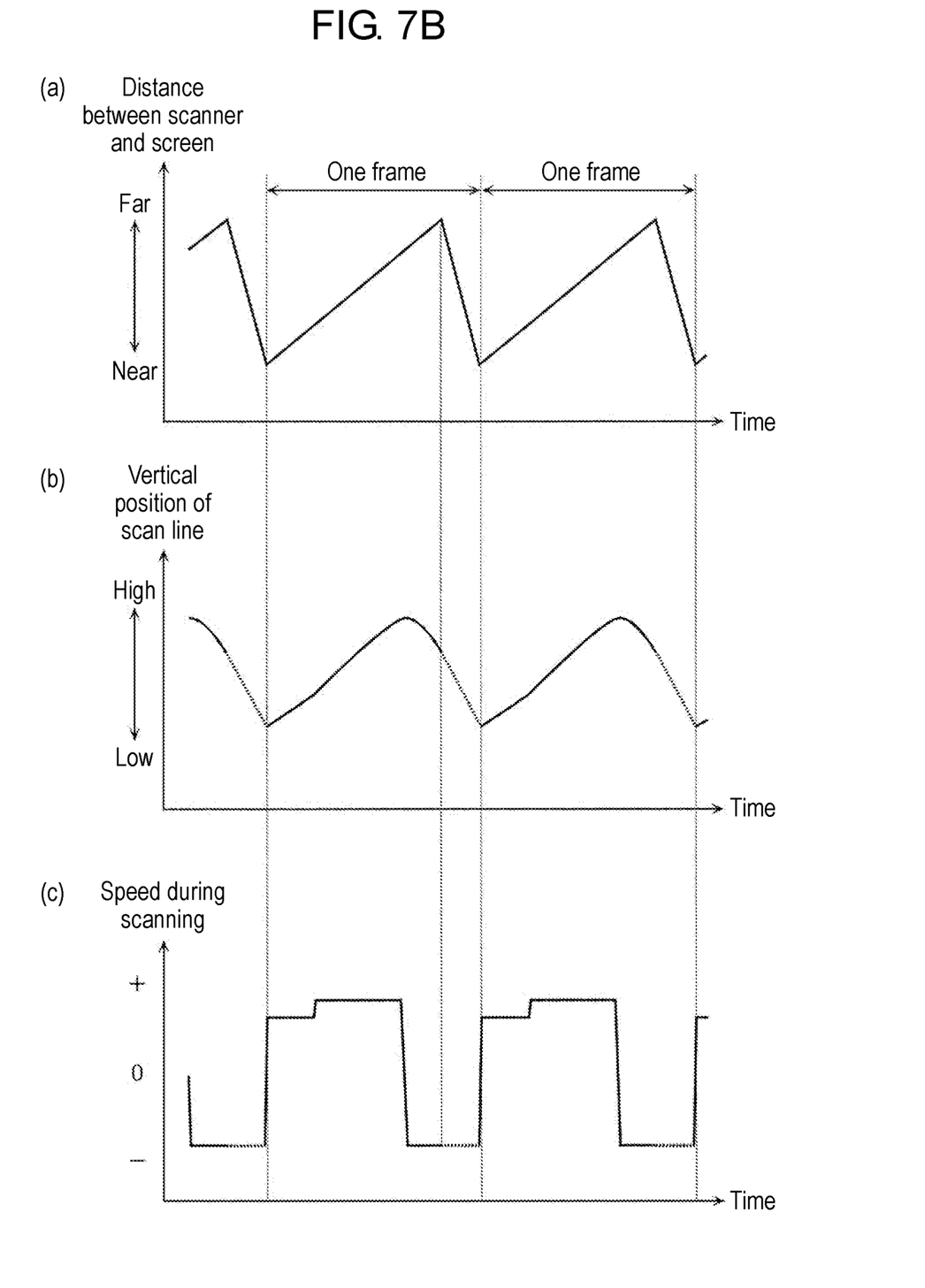
FIG. 7B is a diagram of another example of the action of the scanner and the action of the screen, which are performed at the synchronized cycle.

Part (a) of FIG. 7B indicates an operation of reciprocation of screen 140 with a temporal change of a distance between scanner 130 and screen 140. This operation is common to the operation illustrated in FIG. 7A. In other words, the operation of screen 140 is common between a case for displaying the virtual image having the shape following the background having the difference in height and a case for displaying the virtual image having the shape following the shape of the flat object such as the road included in the background.

Part (b) of FIG. 7B indicates an operation of scanner 130 at the scanning cycle in synchronization with the cycle of reciprocation of screen 140 with a temporal change of a vertical position of the scan line. Note that this illustrated broken line also macroscopically indicates the change, with the same object as the broken line in part (b) of FIG. 7A. Sections with the solid line and sections with the dashed line in the broken line are identical in meaning to the sections with the solid line and the sections of the dashed line in part (b) of FIG. 7A, respectively.

The broken line in part (b) of FIG. 7B and the broken line in part (b) of FIG. 7A are common in saw-tooth shape, and are also common in that a scanning cycle indicated by the broken line is synchronized with the cycle of reciprocation of screen 140 illustrated in part (a) of FIG. 7A.

The broken line in part (b) of FIG. 7B is different from the broken line in part (b) of FIG. 7A in the following points. First, in the broken line in part (b) of FIG. 7B, an initial position of a scan line is lowermost, which is common to the broken line in part (b) of FIG. 7A, and the scan line starts rising at a constant speed. However, from the middle, an inclination is caused to be steep, that is, the speed is increased. With this configuration, after the speed is increased, a position of the scan line when screen 140 is located at a common position is higher as compared to the case in FIG. 7A. Thus the arrow can be represented with an image that forms an elevated portion compared to a portion before the speed is increased.

The broken line in part (b) of FIG. 7B is also different from the broken line in part (b) of FIG. 7A in that, when the scan line reaches the uppermost point before screen 140 reaches a turning back position, the scan line turns to descend. The speed of the scan line in the vertical direction turns to be negative due to a reversed movement direction. At this time, a portion with a descending scan line is generated in the section with the solid line, which is not observed with the broken line in part (b) of FIG. 7A. The position of the scan line when screen 140 is located at a common position is lowered more than that in the case in FIG. 7A. As a result, the arrow can be represented with an image forming a portion that appears to follow the downward slope.

When screen 140 reaches the turning back position, the raster scan is stopped, and the scan line is returned to the initial position concurrently with the movement of screen 140 returning to the initial position.

As described above, during the raster scan performed by scanner 130, the speed of vertical movement of the scan line is changed. This change is provided such that a shape of a virtual image follows a shape of an object included in a background of the virtual image to be displayed, in this example, a shape of the road. Part (c) of FIG. 7B is a graph illustrating this speed relative to time. Sections with the solid line and sections with the dashed line in the broken line in part (c) are identical in period to the sections with the solid line and the sections with the dashed line in part (b), respectively. The section indicated with the solid line and the section indicated with the dashed line are opposite in movement direction to each other, so that those two sections are different in sign from each other.

Note that, a change in the speed of the vertical movement of the scan line described above is achieved by changing a frequency of amplitude by increasing or decreasing a drive signal that is, for example, a drive current or a drive voltage to be supplied to scanner 130 configured with the MEMS scanner.

Figure 8A:
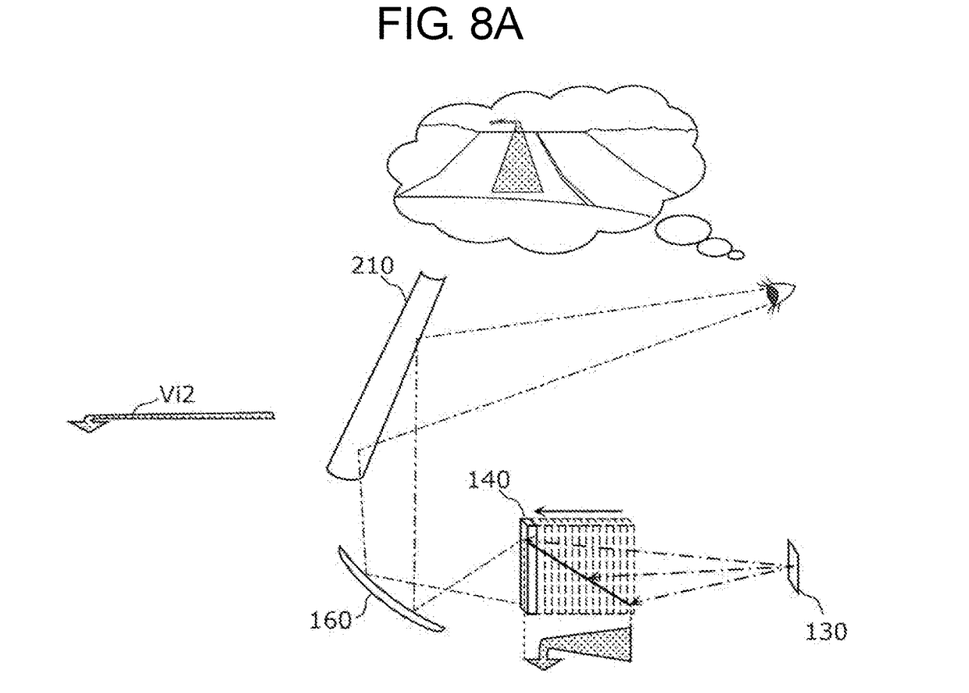
FIG. 8A is a view of an example of a vertical movement trajectory of a scan line when the virtual image having the shape not following the background object to be superimposed is displayed.
Figure 8B:
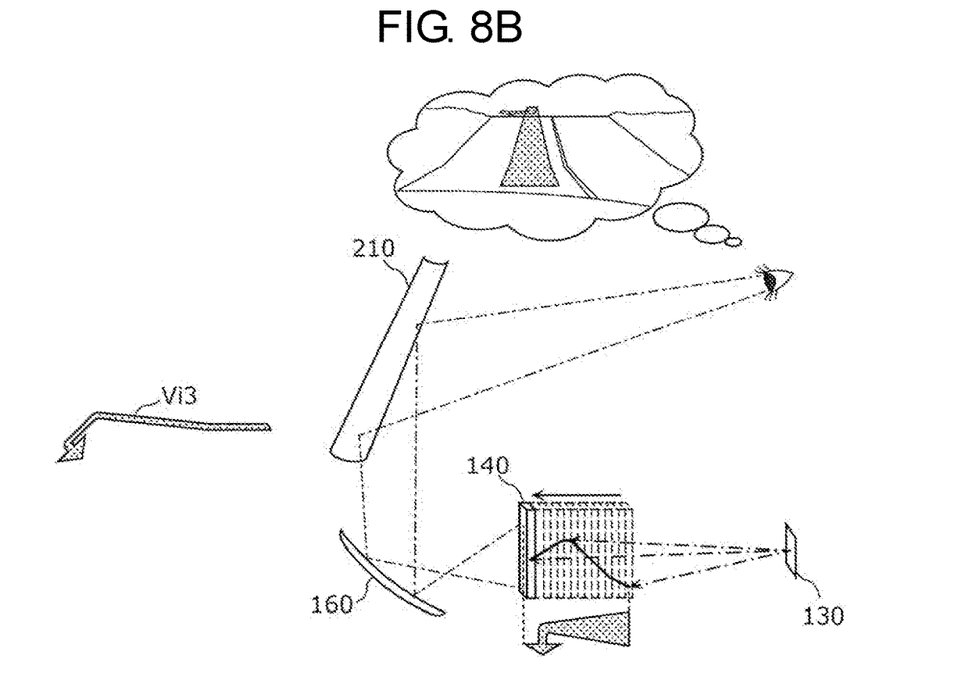
FIG. 8B is a view of an example of the vertical movement trajectory of the scan line when the virtual image having the shape following the background object to be superimposed is displayed.

FIGS. 8A and 8B are schematic views illustrating differences between operations, in two patterns, of scanner 130 and screen 140 described with reference to FIGS. 6A to 7B, with respect to a vertical movement trajectory of the scan line in screen 140 and the virtual image generated by each operation. FIG. 8A corresponds to virtual image Vi2 illustrated in FIG. 6A and the operation illustrated in FIG. 7A, and FIG. 8B corresponds to virtual image Vi3 illustrated in FIG. 6B and the operation illustrated in FIG. 7B. Presence of the change of the vertical movement speed of the scan line described above is represented as a difference in position of the scan line on moving screen 140 between FIGS. 8A and 8B. The difference in position of the scan line also leads to a difference in appearance of a virtual image to be generated.

Note that, to cause the shape of the virtual image to follow the shape of the object that is included in the background and is superimposed in the above-described manner, information indicating the shape of this object is needed. When display apparatus 100 is mounted on the vehicle as described above, and the object is the road, for example, the information indicating the shape of the road to be used herein includes geographic information including at least one of obtained geographic information detected by using a sensor serving as an external device of display apparatus 100, and map information obtained from a car navigation system that is mounted on the vehicle or is available through the Internet.

Heretofore, the exemplary embodiment has been described, but numerical values, as well as shapes, materials, and disposition of the constituent elements, and other factors in the above description and the drawings referred in the description are merely illustrative, and are not intended to limit the present invention.

For example, the vertical and horizontal directions in the description for the laser-light scanning are defined using expression used in a field of a scanning system, for convenience of the description, and do not intend to limit a scan direction with respect to gravity in display apparatus 100 that is actually used.

Furthermore, a correspondence between a distance from scanner 130 to screen 140 and a vertical position of a scan line, and initial positions of screen 140 and the scan line are not limited to those illustrated in FIGS. 4, 7A, 7B, 8A, and 8A. A vertical correspondence between an image formed on screen 140 and a virtual image is a design matter that can be modified according to a mode of projection performed by projection unit 160.

In the above description, scanner 130 preforms the raster scan only in a period in which reciprocating screen 140 goes far away. However, instead of this configuration, the raster scan may be performed only in a period in which reciprocating screen 140 comes near, or may be performed in both periods. When the raster scan is performed in both the forward path and the return path of the reciprocation, each broken line illustrated in part (a) and part (b) of FIG. 7A has a bisymmetrical waveform, instead of the saw-tooth waveform. The sections with the dashed line illustrated in part (b) are changed to have the solid line illustrating the sections during which the laser light is emitted to screen 140. Note that the synchronization between the cycle of the operation of scanner 130 and the scanning cycle of screen 140 is maintained. The same is applied to the broken lines illustrated in part (a) and part (b) of FIG. 7B.

The raster scan may be performed such that the laser light is emitted to screen 140 only during scanning on one way in the horizontal direction, or may be so-called boustrophedon.

Screen 140 described above is the diffusing screen in which the laser light is emitted to one main surface thereof, and an image formed on the other main surface thereof is projected by projection unit 160, to form a virtual image through display medium 190, but the configuration of screen 140 is not limited to this mode. For example, screen 140 may be a liquid crystal screen, and an image depicted on a display surface thereof may be projected onto display medium 190 by projection unit 160.

In display apparatus 100, in addition to screen 140 described above, a screen that is moved but is not vibrated, or a screen whose position is fixed may be simultaneously used. For example, the screen that is moved but is not vibrated does not provide a sense of depth, but can be used for display of a virtual image of an object whose display distance is changeable, for example, an object indicating an anteriorly-presenting traffic sign. Further, for example, the screen whose position is fixed is used for display of a virtual image of, for example, a running speed of vehicle 200 or an amount of fuel remaining, which may be displayed regardless of a shape of an object in a background.

Heretofore, an example in which display apparatus 100 is mounted on vehicle 200, and the windshield is used as the display medium is described. However a use mode is not limited to this mode. For example, the display medium may be a lens of smartglasses or a shield of a helmet. Note that, in any use mode, examples of an item displayed to a user as a virtual image having a shape that follows a shape of an object to be superimposed on a background include graphics and characters indicating information about a road such as route guidance information or a position of lane marking.

In the above description, the external devices such as the display medium and the navigation system do not have inclusion relation with display apparatus 100. However, those devices may have the inclusion relation with each other. For example, a configuration in which display apparatus 100 includes the display medium or a configuration in which the navigation system includes display apparatus 100 does not depart from the gist of the present invention.

In the above exemplary embodiment, the constituent elements may be implemented by dedicated hardware or by execution of software programs individually suitable for the constituent elements. The constituent elements may be implemented by a program execution section, such as a CPU or a processor, reading and executing software programs stored in a recording medium, such as a hard disk or a semiconductor memory.

The display apparatus according to one aspect has been described above based on the exemplary embodiment. However, the present invention is not limited to this exemplary embodiment. Configurations in which various variations conceived by those skilled in the art are applied to the present exemplary embodiment, and aspects established by combining constituent elements in different exemplary embodiments may also fall within the technical scope of the present invention described above, without departing from the gist of the present invention.

INDUSTRIAL APPLICABILITY

The present invention is applicable to a display apparatus that displays a virtual image by using a display medium. For example, the present invention is applicable to a vehicular HUD that displays a virtual image by using a windshield as the display medium.

REFERENCE MARKS IN THE DRAWINGS 100 display apparatus
110 controller
120 light source
130 scanner
140 screen
150 drive unit
160 projection unit
190 display medium
200 vehicle
210 windshield
220 dashboard

The invention claimed is:

1. A display apparatus comprising an optical system for displaying a virtual image that is three-dimensional by using a display medium that is transparent, wherein
the optical system includes
a laser configured to emit laser light,
a micro electro mechanical system (MEMS) scanner configured to receive and reflect the laser light, and perform scanning with the laser light that is reflected,
a screen configured to form an image on a surface of the screen with the MEMS scanner scanning the surface with the laser light,
a projection circuit configured to generate a virtual image that is perceived by a user, by projecting the image formed on the surface of the screen onto the display medium, and
a drive circuit configured to reciprocate the screen scanned with the laser light in a predetermined section along an optical path of the optical system at a predetermined cycle, wherein
the MEMS scanner
performs the scanning by repeatedly raster-scanning the screen with the laser light at a scanning cycle that is synchronized with the predetermined cycle, when the screen moves away from the display medium,
in the raster-scanning, changes a vertical movement speed of a scan line on the screen based on a slope of a road extending forward in a route of the user that is included in a background and is superimposed with the virtual image when viewed from the user,
a vertical position of the scan line on the screen rises at a corresponding rate with a screen movement, while the screen travels along a screen movement path in a first direction, the first direction being a movement direction which the screen moves away from the display medium and towards the MEMS scanner, when a vehicle travels along a flat surface, and the vertical position of the scan line on the screen rises at a rate different from the screen movement when the vehicle travels along a single direction having an inclined slope having a peak, such that the vertical position of the scan line on the screen becomes lowered from rising at least in part before the screen reaches an end of the screen movement path in the first direction to cause a portion of the virtual image projected while the vertical position of the scan line on the screen becomes lowered to overlap with another portion of the virtual image projected when the vertical position of the scan line on the screen rises, such that the overlap occurs at the peak of the inclined slope.

2. The display apparatus according to claim 1, wherein the MEMS scanner changes the vertical movement speed based on geographic information indicating a shape of the road, to cause a shape of the virtual image to vertically follow the shape of the road.

3. The display apparatus according to claim 2, wherein the display medium is a windshield of a vehicle, the optical system is mounted on the vehicle, the geographic information includes at least one of detected geographic information obtained by using a sensor that is mounted on the vehicle and is configured to detect a landform ahead of the vehicle and map information indicating the landform ahead of the vehicle, and the virtual image includes a graphic or a character indicating at least one of route guidance information and information about the road, to be presented to the user.

4. The display apparatus according to claim 1, wherein the vertical position of the scan line is parallel with a height of the road to reflect a relative slope of the road whether visible to the user or not.

5. The display apparatus according to claim 1, wherein the laser configured to emit the laser light when the screen travels in a first direction along the screen movement path, and not emit the laser light when the screen travels in a second direction along the screen movement path.

6. The display apparatus according to claim 1, wherein the screen movement path is parallel with a movement axis of the vehicle.

7. The display apparatus according to claim 1, wherein the raster-scanning is performed only when the screen travels in one direction along the screen movement path among two directions available.

8. The display apparatus according to claim 1, further comprising an acquisition circuit for obtaining the slope of the road.

9. The display apparatus according to claim 8, wherein the acquisitions circuit is a sensor or included in a navigation system.

10. The display apparatus according to claim 1, wherein the virtual image is an arrow with varying widths along its length.

* * * * *